United States Patent
Rodin et al.

(10) Patent No.: US 11,804,336 B2
(45) Date of Patent: Oct. 31, 2023

(54) ULTRACAPACITOR MODULE WITH INTEGRATED BYPASS DIODE AND RELATED SYSTEMS

(71) Applicant: General Electric Company, Schenectady, NY (US)

(72) Inventors: Michael Lawton Rodin, Salem, VA (US); Kyle Conrad Siy, Clifton Park, NY (US); Jeffrey Alan Melius, Roanoke, VA (US); Michael Graham McClure, Albany, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/692,476

(22) Filed: Mar. 11, 2022

(65) Prior Publication Data

US 2023/0290582 A1 Sep. 14, 2023

(51) Int. Cl.
*H01G 11/82* (2013.01)
*H01G 11/10* (2013.01)
*H02J 7/00* (2006.01)
*H02J 7/34* (2006.01)
*F03D 7/02* (2006.01)

(52) U.S. Cl.
CPC ........... *H01G 11/82* (2013.01); *F03D 7/0224* (2013.01); *H01G 11/10* (2013.01); *H02J 7/0042* (2013.01); *H02J 7/345* (2013.01); *H02J 2207/50* (2020.01)

(58) Field of Classification Search
CPC ....... H01G 11/82; H01G 11/10; H02J 7/0042; H02J 7/345; H02J 2207/50
See application file for complete search history.

(56) References Cited

U.S. PATENT DOCUMENTS

| 6,838,923 B2 * | 1/2005 | Pearson | H01M 8/04917 327/309 |
| 7,034,580 B2 * | 4/2006 | Yano | H02J 7/0016 327/75 |
| 7,087,327 B2 * | 8/2006 | Pearson | H01M 8/0494 429/432 |

(Continued)

FOREIGN PATENT DOCUMENTS

GB 2569947 A 7/2019

OTHER PUBLICATIONS

EP Search Report for EP application No. 23159715.4, dated Jul. 19, 2023, 8 pages.

*Primary Examiner* — Pedro J Cuevas
(74) *Attorney, Agent, or Firm* — Dority & Manning, P.A.

(57) ABSTRACT

The present disclosure is directed to an ultracapacitor module comprising a housing and terminals, the terminals exposed through the housing, the housing containing one or more internal capacitor cells and one or more integrated, internal bypass diodes arranged together such that the ultracapacitor module additionally comprises an integrated, internal bypass circuit connected in parallel with the terminals. The present disclosure also is directed to an ultracapacitor module comprising a housing and terminals, the terminals exposed through the housing, the housing containing one or more internal capacitor cells and at least one set of one or more integrated, internal bypass diodes connected in parallel to the at least one or more internal capacitor cells, such that the ultracapacitor module additionally comprises an integrated, internal bypass circuit.

20 Claims, 8 Drawing Sheets

(56) References Cited

U.S. PATENT DOCUMENTS

| | | | | |
|---|---|---|---|---|
| 7,446,575 B2* | 11/2008 | Yano | H02J 7/0016 | 327/75 |
| 7,521,138 B2* | 4/2009 | Pearson | H01M 8/0491 | 320/101 |
| 8,390,147 B2* | 3/2013 | Stauth | H02J 7/345 | 307/77 |
| 8,593,111 B2* | 11/2013 | Tatebayashi | H02J 7/0013 | 320/128 |
| 8,987,935 B2* | 3/2015 | King | B60L 58/26 | 307/10.1 |
| 9,525,290 B2* | 12/2016 | Snyder | H02J 7/0016 | |
| 10,414,285 B2* | 9/2019 | Park | H02J 7/00302 | |
| 10,788,538 B2* | 9/2020 | Melius | G01R 31/392 | |
| 10,826,306 B2* | 11/2020 | Wagoner | F03D 7/0264 | |
| 10,914,290 B2* | 2/2021 | Hoffmann | F03D 17/00 | |
| 10,965,132 B2* | 3/2021 | Wagoner | H02J 7/0068 | |
| 11,073,130 B1 | 7/2021 | Wilks et al. | | |
| 2004/0009380 A1* | 1/2004 | Pearson | H01M 8/04947 | 429/513 |
| 2004/0126635 A1* | 7/2004 | Pearson | H01M 8/0488 | 429/430 |
| 2004/0228055 A1* | 11/2004 | Pearson | H02J 7/345 | 361/93.1 |
| 2004/0251934 A1* | 12/2004 | Yano | H03K 5/08 | 327/91 |
| 2005/0249988 A1* | 11/2005 | Pearson | H01M 16/006 | 429/432 |
| 2005/0249989 A1* | 11/2005 | Pearson | H01M 8/0491 | 429/432 |
| 2006/0139063 A1* | 6/2006 | Yano | H02J 7/0016 | 327/74 |
| 2006/0172162 A1* | 8/2006 | Pearson | H01M 8/04089 | 429/432 |
| 2007/0001651 A1 | 1/2007 | Harvey | | |
| 2010/0072950 A1* | 3/2010 | Tatebayashi | H02J 7/0031 | 320/134 |
| 2010/0289337 A1* | 11/2010 | Stauth | H02J 7/345 | 307/77 |
| 2013/0169038 A1* | 7/2013 | King | H02J 7/0031 | 307/66 |
| 2015/0115736 A1* | 4/2015 | Snyder | H02J 7/0048 | 307/115 |
| 2017/0085101 A1 | 3/2017 | Zakharyan et al. | | |
| 2017/0352495 A1* | 12/2017 | Sato | H05K 5/0026 | |
| 2018/0372072 A1 | 12/2018 | Danielsen et al. | | |
| 2019/0079139 A1* | 3/2019 | Melius | H01M 10/486 | |
| 2019/0285058 A1* | 9/2019 | Hoffmann | F03D 17/00 | |
| 2020/0091739 A1* | 3/2020 | Wagoner | H02J 7/0013 | |
| 2020/0091743 A1* | 3/2020 | Wagoner | H02J 7/0068 | |

* cited by examiner

ULTRACAPACITOR MODULE WITH INTEGRATED BYPASS DIODE AND RELATED SYSTEMS

FIELD

The present disclosure relates generally to renewable energy assets, such as wind turbines, and more particularly, to an ultracapacitor module and related methods for electrically powering at least a portion of a renewable energy asset, such as a wind turbine pitch drive system.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Each of the rotor blades generally includes a pitch drive system located in the hub of the wind turbine that is used to safely operate the wind turbine and to extract the maximum amount of power under given wind conditions, i.e., by changing the angle of the rotor blades relative to the wind. Such pitch drive systems typically include a pitch motor, a pitch gearbox, and a pitch pinion that engages a pitch bearing. Further, the pitch motor is typically coupled to the pitch gearbox such that the pitch motor imparts mechanical force to the pitch gearbox. Similarly, the pitch gearbox may be coupled to the pitch pinion for rotation therewith. The pitch pinion may, in turn, be in rotational engagement with the pitch bearing coupled between the hub and one of the rotor blades such that rotation of the pitch pinion causes rotation of the pitch bearing. Thus, rotation of the pitch motor drives the pitch gearbox and the pitch pinion, thereby rotating the pitch bearing and the corresponding rotor blade about a pitch axis.

Such pitch drive systems also typically are communicatively coupled to a pitch energy storage system disposed within the wind turbine. The pitch energy storage system commonly includes a bank of ultracapacitor modules configured to store potential energy for conversion into electricity used by the pitch drive systems. However, although conventional banks of ultracapacitor modules can be used and relied upon to provide sufficient drive current when needed, conventional pitch energy storage systems relying on ultracapacitor modules and/or batteries to handle extreme or unexpected load events can lose the ability to safely provide sufficient current and voltage as the individual ultracapacitor modules, batteries, components, and/or the overall system ages, or if the load event is long lasting.

In view of the aforementioned, there is a need for an improved ultracapacitor module and related systems.

BRIEF DESCRIPTION

Aspects and advantages of the invention will be set forth in part in the following description, or may be obvious from the description, or may be learned through practice of the invention.

In an aspect, the present disclosure is directed to an ultracapacitor module including a housing and terminals. The housing contains one or more internal capacitor cells and one or more integrated, internal bypass diodes arranged together to form an integrated, internal bypass circuit. The terminals are exposed through the housing and the integrated, internal bypass circuit is connected in parallel with the terminals.

In another aspect, the present disclosure is directed to an ultracapacitor module including a housing and terminals. The housing contains one or more internal capacitor cells and at least one set of one or more integrated, internal bypass diodes. The at least one set of one or more integrated, internal bypass diodes are connected in parallel to the one or more internal capacitor cells to form an integrated, internal bypass circuit. The terminals are exposed through the housing.

In another aspect, the present disclosure is directed to wind turbine including an energy storage system for electrically powering, at least a portion of, the wind turbine with an electrical output from one or more ultracapacitor modules connected to one or more battery modules. The wind turbine includes one or more ultracapacitor modules and one or more battery modules. Each of the one or more ultracapacitor modules includes a housing and terminals exposed through the housing. In one embodiment, the housing contains one or more internal capacitor cells and one or more integrated, internal bypass diodes arranged together to form an integrated, internal bypass circuit, and the integrated, internal bypass circuit is connected in parallel with the terminals. In another embodiment, the housing contains one or more internal capacitor cells and at least one set of one or more integrated, internal bypass diodes, and the at least one set of one or more integrated, internal bypass diodes are connected in parallel to the one or more internal capacitor cells to form an integrated, internal bypass circuit.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present inventive concepts, including the best mode thereof, directed to one of ordinary skill in the art, is set forth in the specification, which makes reference to the appended figures, in which.

Figure 1:
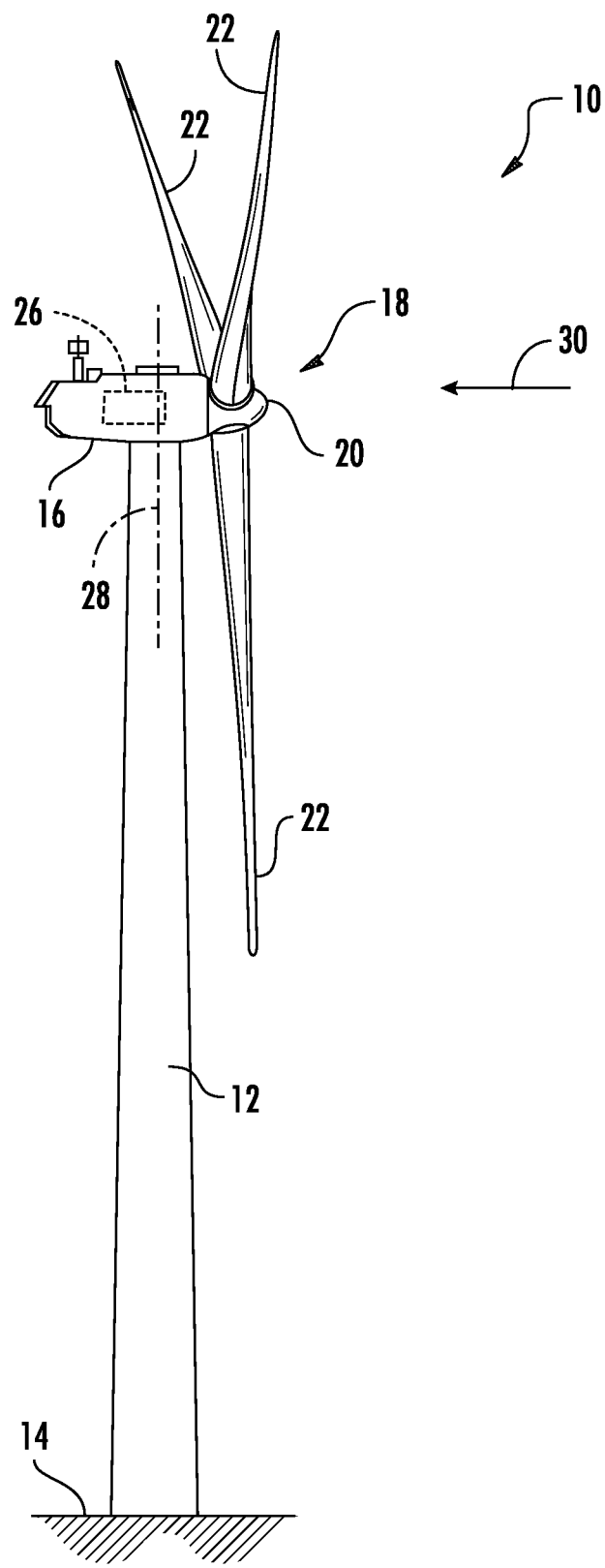
FIG. 1 illustrates a perspective view of an embodiment of a wind turbine according to the present disclosure.

Repeat use of reference characters in the present specification and drawings is intended to represent the same or analogous features or elements of the present invention.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

A wind turbine—a typical renewable energy asset—commonly stores energy for emergency pitch events within batteries and/or, more recently, ultracapacitor modules. These modules are mounted within an energy storage system cabinet or housing, and these modules usually are situated within the wind turbine nacelle. In solar panel arrays—another renewable energy asset—the energy storage system stores energy for sun-tracking and panel adjustment and the system is situated remote to but nearby the asset, for example.

Wind turbine energy storage systems commonly comprise a system cabinet/system housing and a bank of battery modules for electrically powering at least a portion of the wind turbine with electrical output from the energy storage system. Off-shore or remote wind turbines, for example, may have energy storage systems for electrically powering pitch drive systems for the wind turbine blades or a yaw drive system(s) for the wind turbine nacelle.

It is generally well understood that energy storage systems that are entirely reliant on battery modules suffer from a range of deficiencies. Batteries, as one particular type of energy storage media, suffers from having a relatively slow charging and discharging rate, as well as a relatively narrow functional temperature range, when compared to other energy storage media like ultracapacitors. Moreover, batteries also have a relatively shorter useful life than ultracapacitors.

Accordingly, improved energy storage systems may include ultracapacitor modules for storing potential electric energy. The ultracapacitor modules complement, supplement, or replace the battery modules that the energy storage system previously relied upon. In particular, the ultracapacitor modules afford these beneficial traits due to their: (1) relatively fast charging and discharging rate; (2) relatively broad functional temperature ranges; and (3) relatively long useful life.

In certain practical implementations, the ultracapacitor module(s) are configured to interface with the existing installation hardware and/or software intended for the battery module(s), such that installation time and cost is reduced through the avoidance of specialty customization or retrofitting. In other practical implementations, the ultracapacitor module(s) are configured to work in tandem with the existing, remaining, or newly installed battery modules of the energy storage system. As such, the ultracapacitor modules are configured for replacing and "taking the place of" at least one battery module within the energy storage system.

Unfortunately, these improved energy storage systems—now reliant upon ultracapacitor modules and/or battery modules—still suffer from a few deficiencies. In particular, certain improved energy storage systems commonly rely on a bank(s) of ultracapacitor modules and/or battery modules that are connected in series. If electrolyte drying or corrosion occurs (or any of the other known causes of capacitor-cell failure/high-impedance damage), then an entire ultracapacitor module may become compromised. And, if simply one of the ultracapacitor-cells/ultracapacitor modules fails—even with the redundancy of ultracapacitor or battery modules in the system—the mono-source or hybrid energy storage system also will fail, and the system will not be able to provide sufficient electrical output for electrically powering the at least a portion of the renewable energy asset.

In another example, improved hybrid energy storage systems—during long-lasting load events—also suffer from a few deficiencies. In particular, due to the relatively low specific energy of a capacitor-cell (as compared to that of a battery cell), and due to the relatively high likelihood that a long-lasting load event will result in a system with one or more depleted capacitor-cell(s) in series with one or more non-depleted battery cells, the partially depleted ultracapacitor modules will experience reverse biasing. This reverse biasing is known to result in significant heat generation, or catastrophic or premature failure, and may result in the explosion of the cell(s).

The present disclosure, therefore, is directed to further improved energy storage systems and to further improved ultracapacitor modules for electrically powering at least a portion of a renewable energy asset, and for resolving the deficiencies described herein. For example, an embodiment of an energy storage system of the present disclosure comprises one or more bypass diodes arranged external to the ultracapacitor modules. The one or more bypass diodes provide a current flow path for the electrical output derived from the one or more ultracapacitor modules and the one or more battery modules, for example, during a fault or a failure of the one or more ultracapacitor modules.

However, a person having ordinary skill in the art recognizes that under certain circumstances the external connections, circuitry, and hardware demanded by this embodiment of the energy storage system of the present disclosure results in some lingering complications. In particular, the external connections, circuitry, and hardware demanded by this embodiment of the energy storage system will necessitate: (1) additional wiring, (2) special crimping processes, and (3) additional module connection terminals and exposed diode terminals. A person having ordinary skill in the art also recognizes that this will put some technicians corresponding to the renewable energy asset and the asset itself at risk. This is particularly true for wind turbine implementations, wherein the turbine technicians have to operate inside dark, cramped, stagnant spaces, and wherein even a dropped screw can bridge module terminals or points-of-contact and risk short-circuits, electrical arcing, electrocution, and/or explosion. Therefore, there is room for further improvements to the ultracapacitor modules and/or to the energy storage systems as described in greater detail herein.

With the above context in mind, the present disclosure also is directed to improved ultracapacitor modules for electrically powering at least a portion of a renewable energy asset, for example, a pitch drive system of a wind turbine.

For example, an embodiment of an improved ultracapacitor module of the present disclosure is configured to replace at least one battery module within an energy storage system without necessitating additional installation modifications to the system housing, battery harness, control system, or other hardware or software associated with the system or the renewable energy asset. The ultracapacitor module also is configured to interface with the existing point(s) of installation/space intended for receiving the battery module(s). Moreover, the ultracapacitor modules comprises one or more internal, integrated bypass diodes arranged to form an integrated, internal bypass circuit that is connected in parallel with the external ultracapacitor terminals, to provide a current flow path for the electrical output from the one or more ultracapacitor modules and the one or more battery modules, for example, during a fault or a failure of the one or more ultracapacitor modules.

In another example, an embodiment of an improved ultracapacitor module of the present disclosure is configured to replace at least one battery module of an energy storage system without necessitating additional installation modifications to the system housing, battery harness, control system, or other hardware or software associated with the system or the renewable energy asset. The ultracapacitor module comprises a plurality of individual capacitor cells or ultracapacitor cells connected in series within the module in order to meet voltage and capacitance requirements for the system and the asset. As in other embodiments, the ultracapacitor module is configured to interface with the existing point(s) of installation/space intended for receiving the battery module(s). Moreover, unlike other embodiments, the ultracapacitor modules of this embodiment comprise one or more internal, integrated bypass diodes in a network to form an integrated, internal bypass circuit that is connected in parallel with each individual capacitor cell or ultracapacitor cell. For this particular embodiment, this structure provides a current flow path for the electrical output from the one or more ultracapacitor modules and the one or more battery modules, for example, during a fault or a failure of one or more individual capacitor cells or ultracapacitor cell in one or more ultracapacitor modules.

Accordingly, the present disclosure provides many advantages not present in the prior art. For example, the present disclosure provides a renewable energy asset comprising an improved mono or hybrid energy storage system that can be used and relied upon to provide sufficient current and voltage during extreme, unexpected, and long-lasting load events, without the system losing the ability to safely provide sufficient current and voltage. The present disclosure also provides an improved mono-source or hybrid energy storage system comprising one or more ultracapacitor modules wherein, even if one of the ultracapacitor cells/ultracapacitor modules fails, the system will continue to safely, effectively, and efficiently provide sufficient electrical output for electrically powering at least a portion of the renewable energy asset. Moreover, the present disclosure provides an improved mono-source or hybrid energy storage system wherein, even if one or more depleted capacitor-cell(s) are in series with one or more non-depleted battery cells, the partially depleted ultracapacitor modules will not experience reverse biasing nor an increased chance of catastrophic and dangerous damage. Further, the present disclosure also provides an improved ultracapacitor module that can readily "take the place of" at least one battery module and fit exactly where the battery module(s) used to fit within the energy housing of the renewable energy asset. Accordingly, the present disclosure provides an improved ultracapacitor module that does not necessitate additional wiring, special crimping processes, or additional module connection terminals or exposed diode terminals, and that helps improve technician safe and reduces risk.

Referring now to the drawings, FIG. 1 illustrates perspective view of an embodiment of a renewable energy asset 10 according to the present disclosure. As shown, the renewable energy asset 10 may be configured as a wind turbine. In an additional embodiment, the renewable energy asset 10 may, for example, be configured as a solar power array, a hydroelectric plant, a fossil fuel generator, and/or a hybrid power generating asset.

When configured as a wind turbine, the renewable energy asset 10 may generally include a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in alternative embodiments, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

As shown in the embodiment of FIG. 1, the wind turbine 10 includes a turbine control system or turbine controller 26 centralized within the nacelle 16. However, it should be appreciated that the turbine controller 26 may be disposed at any location on or in the wind turbine 10, at any location on the support surface 14 or generally at any other location. As is described below with reference to FIG. 3, the turbine controller 26 may generally comprise any suitable processing unit configured to perform the functions described herein. Thus, in several embodiments, the turbine controller 26 may include suitable computer-readable instructions that, when implemented, configure the controller 26 to perform various different actions, such as transmitting and executing wind turbine control signals.

By transmitting and executing wind turbine control signals, the turbine controller 26 (FIG. 4) may generally be configured to control the various operating modes (e.g., start-up or shut-down sequences) and/or components of the wind turbine 10. For example, the controller 26 may be configured to control the yaw direction of the nacelle 16 about a yaw axis 28 to position the rotor blades 22 with respect to the direction 30 of the wind, thereby controlling the load and power output generated by the wind turbine 10. Similarly, the controller 26 may be configured to control the pitch of the individual rotor blades 22 with respect to the direction 30, or to control operation of electric components, sub-systems, or systems of the wind turbine 10.

Figure 2:
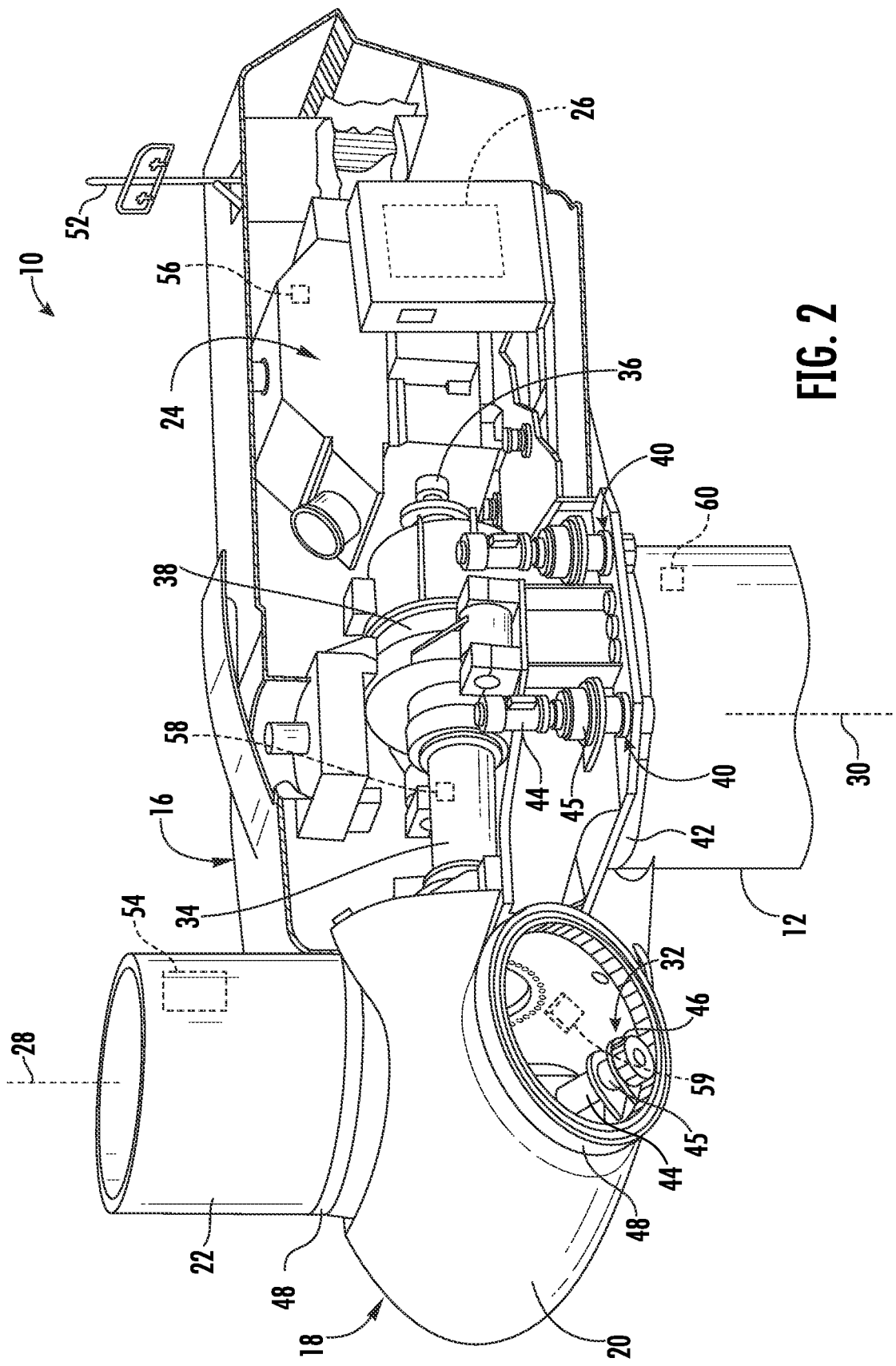
FIG. 2 illustrates a simplified, internal view of an embodiment of the nacelle of the wind turbine of FIG. 1.

Referring now to FIG. 2, a simplified, internal view of one embodiment of the nacelle 16 of the wind turbine 10 is illustrated. As shown, a generator 24 is disposed within the nacelle 16. In general, the generator 24 is coupled to the rotor 18 of the wind turbine 10 for generating electrical power from the rotational energy generated by the rotor 18. The rotor 18 may include a rotor shaft 34 coupled to the hub 20 for rotation therewith. The generator 24 may then be coupled to the rotor shaft 34 such that rotation of the rotor shaft 34 drives the generator 24. In the illustrated embodiment of FIG. 2, the generator 24 includes a generator shaft 36 rotatably coupled to the rotor shaft 34 through a gearbox

38. However, in other embodiments, it should be appreciated that the generator shaft 36 may be rotatably coupled directly to the rotor shaft 34. Alternatively, the generator 24 may be directly rotatably coupled to the rotor shaft 34 (often referred to as a "direct-drive wind turbine").

Each rotor blade 22 includes pitch drive system 32 configured to change the angle of the blades 22 relative to the wind (e.g., by engaging a pitch bearing 48). Further, each pitch drive system 32 may include a pitch motor 44 (e.g., any suitable electric motor), a pitch gearbox 45, and a pitch pinion 46. In such embodiments, the pitch motor 44 may be coupled to the pitch gearbox 45 so that the pitch motor 44 imparts mechanical force to the pitch gearbox 45. Similarly, the pitch gearbox 45 may be coupled to the pitch pinion 46 for rotation therewith. The pitch pinion 46 may, in turn, be in rotational engagement with a pitch bearing 48 coupled between the hub 20 and one of the rotor blades 22 such that rotation of the pitch pinion 46 causes rotation of the pitch bearing 48. Thus, in such embodiments, rotation of the pitch motor 44 drives the pitch gearbox 45 and the pitch pinion 46, thereby rotating the pitch bearing 48 and the corresponding rotor blade 22 about the pitch axis 28.

Additionally, the wind turbine 10 may include one or more yaw drive systems 33 optionally mounted to and/or through a bedplate support frame 40 positioned atop the wind turbine tower 12. In particular, in the illustrated embodiment of FIG. 2, each yaw drive system 33 is mounted to and through the bedplate support frame 40. The wind turbine 10 also includes a plurality of yaw brake assemblies 48 for controlling the rotation of the nacelle 16 about the yaw axis 28. The yaw brake assemblies 48 are mounted to and/or through the bedplate support frame 40.

Additionally, the turbine controller 26 may also be located within the nacelle 16. For example, as shown in the illustrated embodiment, the turbine controller 26 is disposed within a control cabinet 52 mounted to a portion of the nacelle 16. However, in other embodiments, the turbine controller 26 may be disposed at any other suitable location on and/or within the wind turbine 10 or at any suitable location remote to the wind turbine 10. Moreover, the turbine controller 26 may also be communicatively coupled to various components of the wind turbine 10 for generally controlling the wind turbine 10 and systems or components described in the present disclosure.

Figure 3:
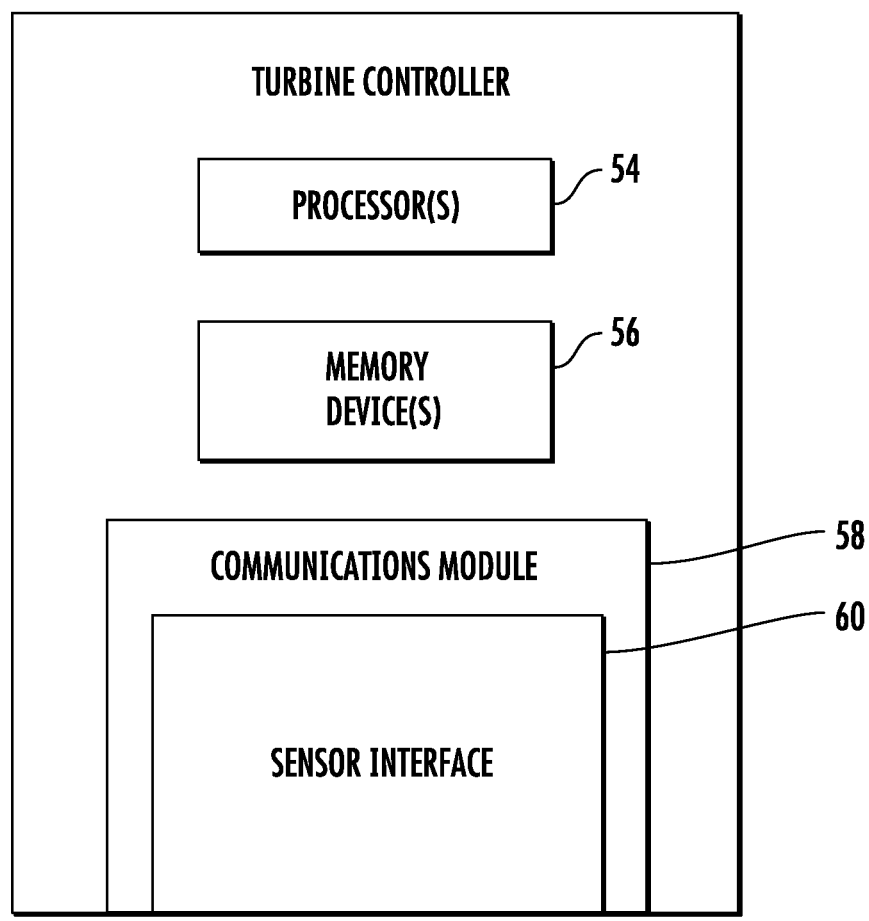
FIG. 3 illustrates a block diagram of an embodiment of suitable components that can be included within a controller of a system according to the present disclosure.

Referring now to FIG. 3, there is illustrated a block diagram of one embodiment of the turbine controller 26 of the wind turbine 10. In general, the turbine controller 26 may comprise a computer or any other suitable processing unit. Thus, in several embodiments, the turbine controller 26 may include one or more processor(s) 54 and associated memory device(s) 56 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 56 of the turbine controller 26 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 56 may generally be configured to store suitable computer-readable instructions that, when implemented by the processor(s) 54, configure the turbine controller 26 to perform various methods and/or steps described in detail herein. The memory device(s) 56 may also be used to store temporary input and output variables and other immediate information during execution by the processor(s) 54 of the computer-readable instructions.

Figure 6:
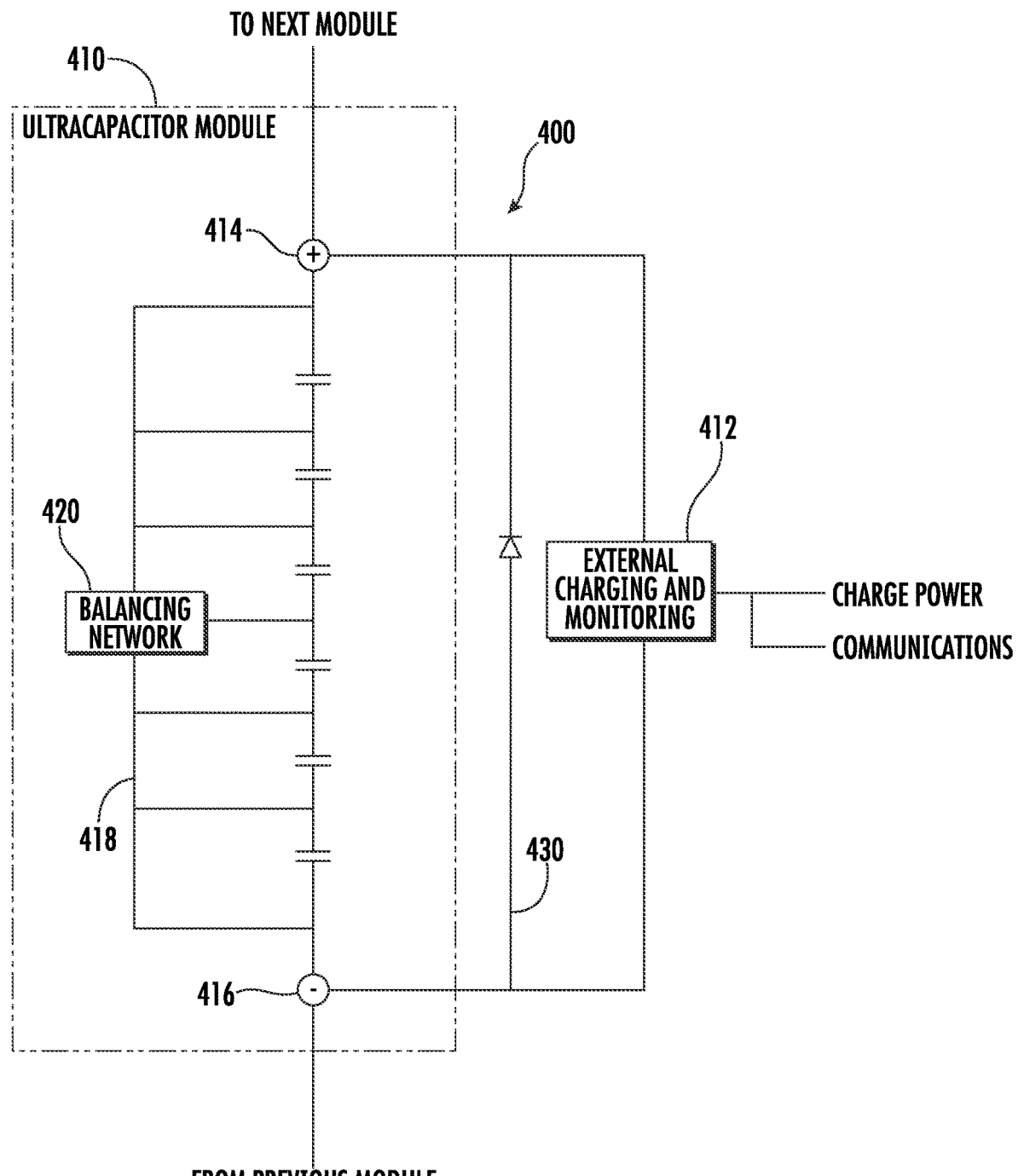
FIG. 6 illustrates a partial, schematic diagram of a portion of an embodiment of an energy storage system.
Figure 7:
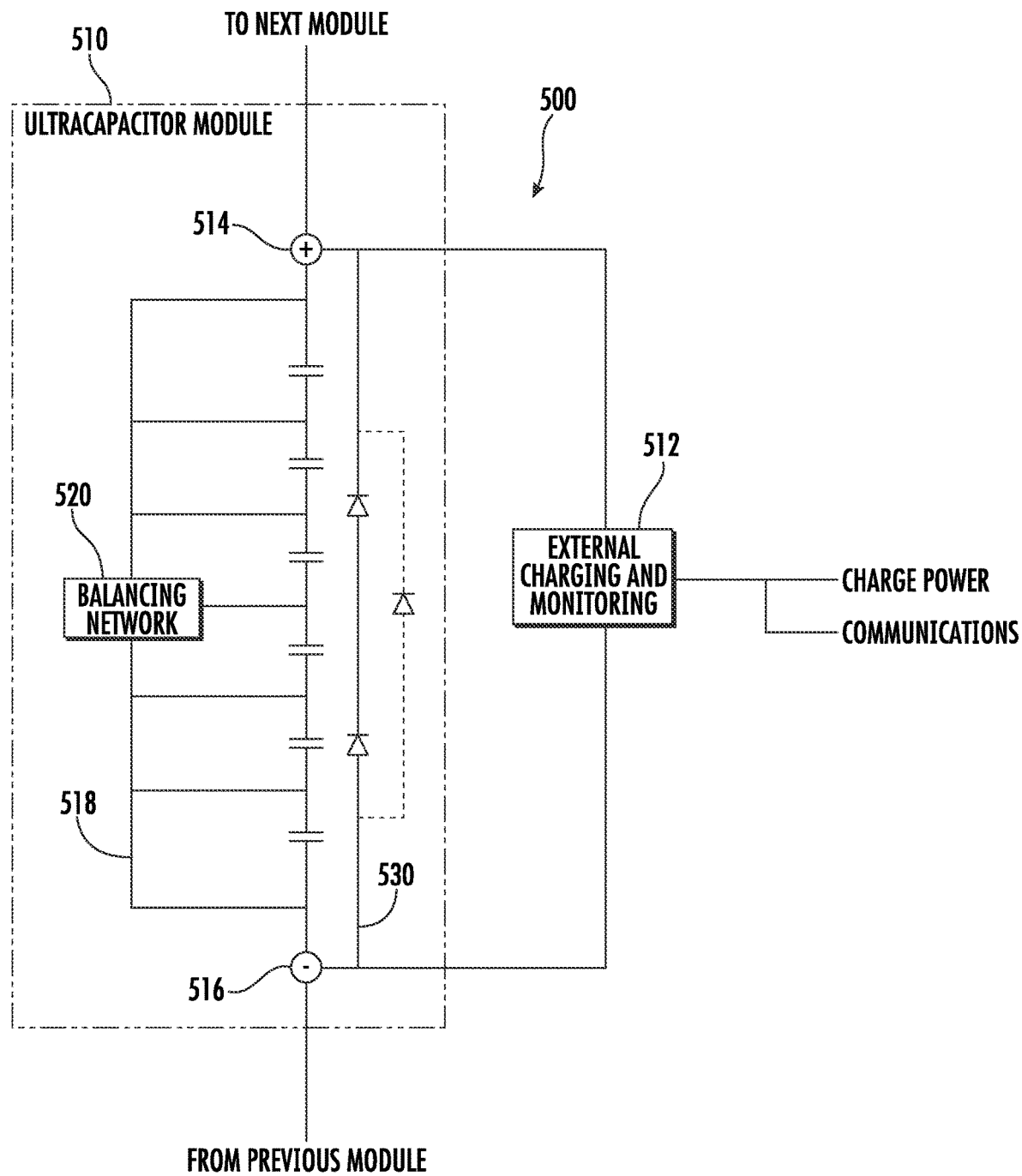
FIG. 7 illustrates a partial, schematic diagram of a portion of an embodiment of a hybrid energy storage system.
Figure 8:
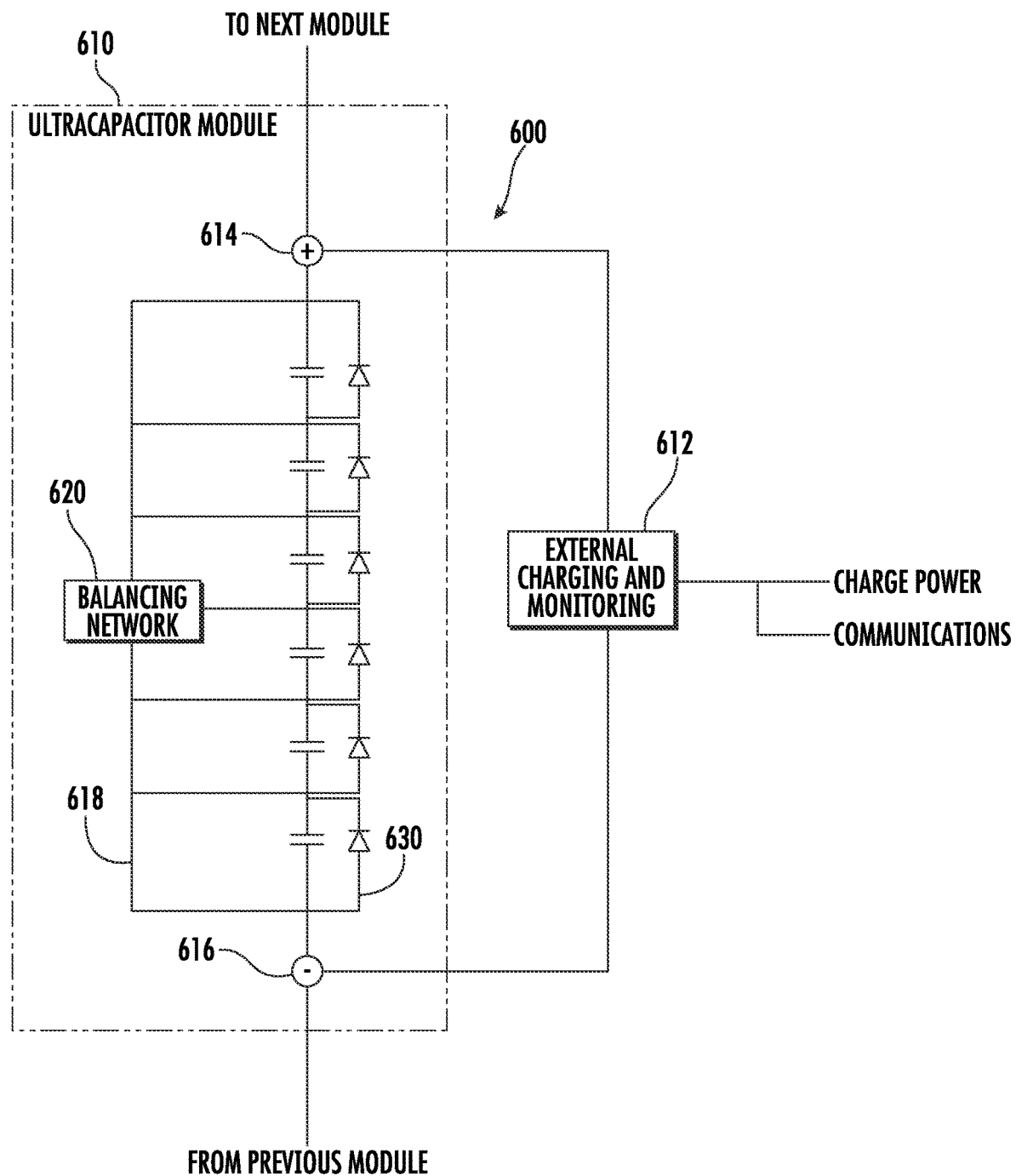
FIG. 8 illustrates a partial, schematic diagram of a portion of another embodiment of a mono-source or hybrid energy storage system.

Additionally, as shown in FIG. 3, the turbine controller 26 may also include a communications module 58 configured to facilitate communication between the turbine controller 26 and the various components of the wind turbine 10 including the pitch drive system 32, and the energy storage system (see FIGS. 6-8). In several embodiments, the communications module 58 may include a sensor interface 60 to permit any sensors 1 of the wind turbine 10 to communicate with the turbine controller 26. For instance, the sensor interface 60 may comprise one or more analog-to-digital converters configured to convert analog signals into digital signals that can be used by the processor(s) 54.

Figure 4:
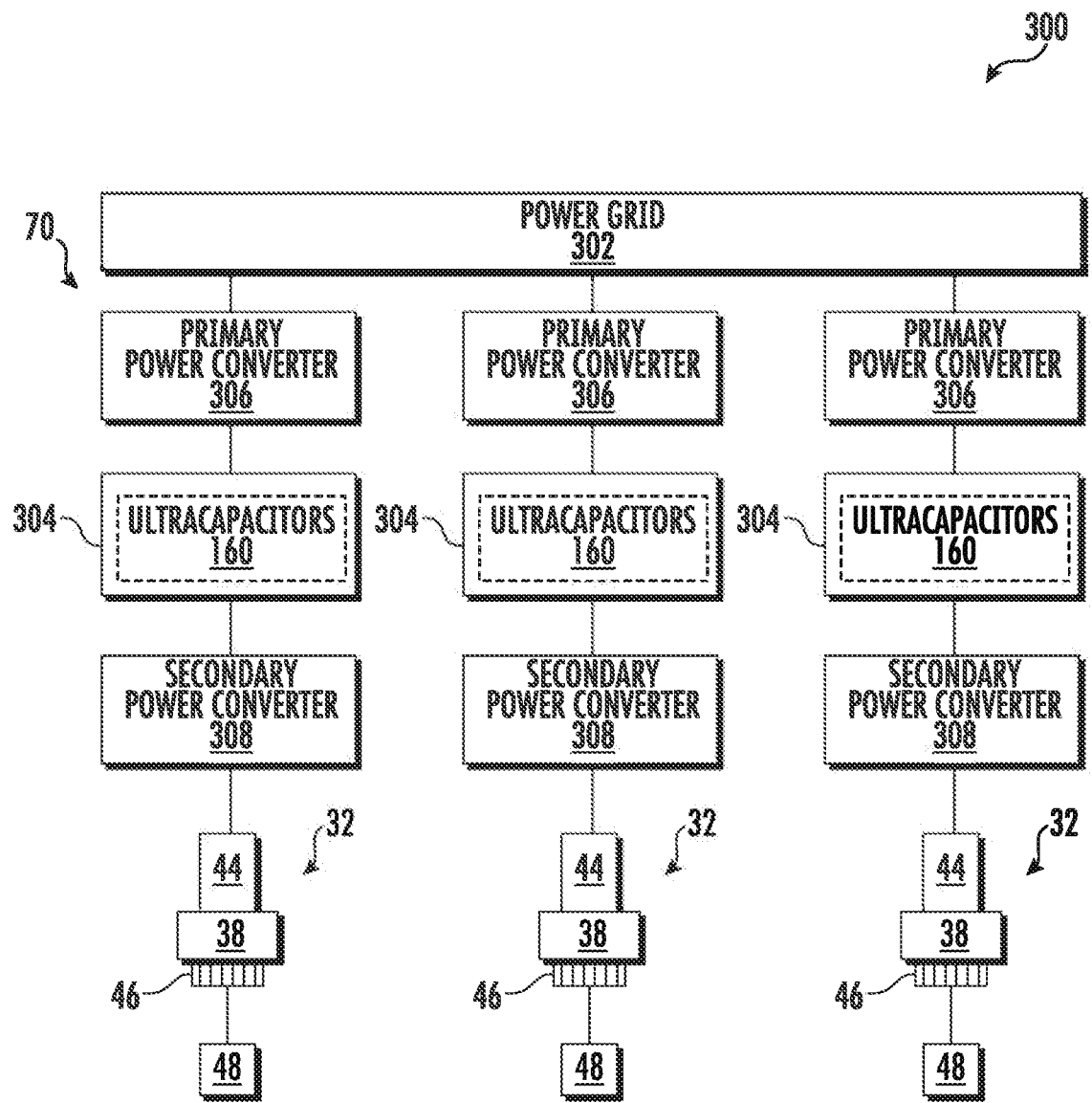
FIG. 4 illustrates the pitch drive systems of the wind turbine communicatively coupled to a power grid as well as a bank of ultracapacitor modules and/or battery modules according to the present disclosure.

Referring now to FIG. 4, each of the pitch drive systems 32 is communicatively coupled to a power grid 302 as well as a bank of ultracapacitor modules and/or battery modules 160. More specifically, in one exemplary embodiment, each of the ultracapacitors of the bank of ultracapacitors 160 may be associated with one of the pitch drive systems 32 and may be stored in an energy storage system housing 304. In some embodiments, the energy storage system housing 304 may be a thermally-isolated container.

During normal operation of the wind turbine 10, a power converter 76 of the wind turbine 10 receives AC power from the power grid 302 and converts the AC power to AC power suitable for driving the pitch motor(s) 44 (e.g., AC motors) of each of the pitch drive systems 32. Additionally, the power converter 76 can convert AC power received from the power grid 302 into direct current (DC) power suitable for charging the bank of ultracapacitor modules and/or battery modules 160. As will be discussed herein in detail, in some instances, the pitch motors 44 may be driven by the bank of ultracapacitor modules and/or battery modules 160.

Figure 5:
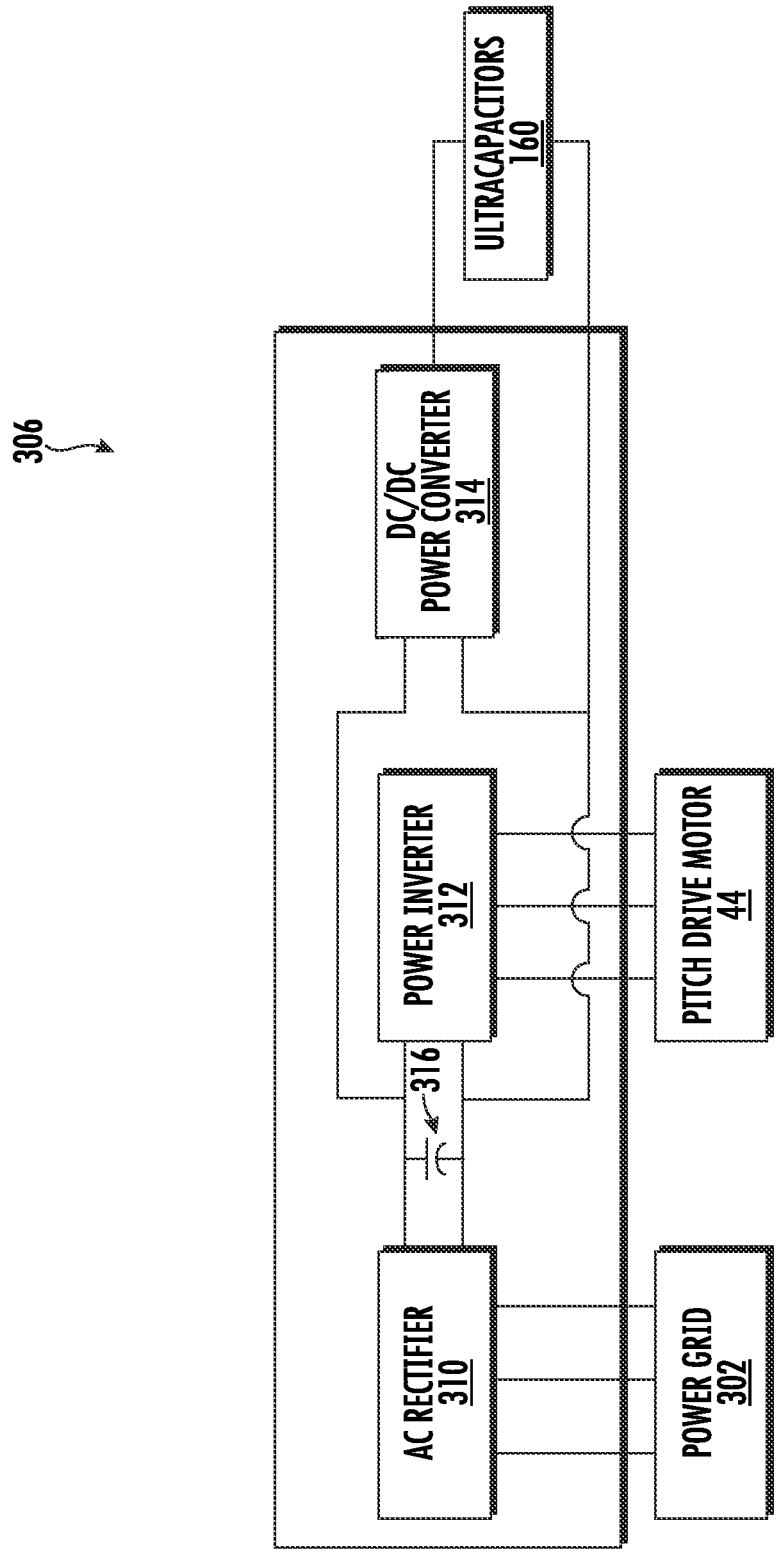
FIG. 5 illustrates a schematic diagram of an embodiment of the power converter of the bank of ultracapacitor modules and/or battery modules.

Referring now to FIG. 5, a schematic diagram of an embodiment of the power converter 306 of the bank of ultracapacitor modules and/or battery modules 160 is illustrated. As shown, the power converter 306 includes an AC rectifier 310 configured to receive AC power from the power grid 302 at a first AC voltage and convert the first AC voltage to DC power at a first DC voltage. Additionally, the AC rectifier 310 is coupled to a power inverter 312 of the power converter 306. More specifically, in one embodiment, the AC rectifier 310 may be coupled to the power inverter 312 via one or more conductors (e.g., wires). In this manner, the output (e.g., DC power at first DC voltage) of the AC rectifier 310 may be provided to the power inverter 312. The primary power converter 310 may also include one or more capacitors 316 (e.g., electrolytic capacitors) coupled between the output of the AC rectifier 310 and the input of the power inverter 312. The one or more capacitors 316 may be configured to reduce or eliminate noise associated with the DC power that the AC rectifier 310 provides to the power inverter 312.

The power inverter 312 is configured to convert the DC power at the first DC voltage to AC power at a second AC voltage. In certain embodiments, the second AC voltage may be different (e.g., greater than or less than) than the first AC voltage associated with the AC power that the AC rectifier 310 receives from the power grid 302. The output (e.g., AC power at the second AC voltage) may be provided to the pitch motors 44 of the pitch drive systems 32.

The power converter 306 also includes a DC-to-DC power converter 314. The DC-to-DC power converter 314 may be coupled to one or more input terminals (e.g., leads) associated with the power inverter 312. In this manner, the DC-to-DC power converter 314 can receive the DC power at the first DC voltage. Additionally, the DC-to-DC power converter 314 may be coupled to the bank of ultracapacitors 160. In certain embodiments, the DC-to-DC power converter 314 can convert the DC power at the first DC voltage to DC power at a second DC voltage that is suitable for charging and maintaining the bank of ultracapacitors 160. It should be appreciated that the second DC voltage can be different (e.g., less than or greater than) than the first DC voltage.

It should also be appreciated that FIGS. 1-5 are provided for illustrative purposes, and to place the present subject matter in an exemplary field of use. A person having ordinary skill in the art readily appreciates that the present disclosure is not limited to any one type of renewable energy asset configuration. For purposes of clarity, the following description is presented within the context of the wind turbine 10 of FIGS. 1-5.

Referring now to FIG. 6, a partial, schematic diagram of a portion of an embodiment of an energy storage system 400 is shown. The energy storage system 400 is used for electrically powering a pitch drive system(s) 32 of the wind turbine 10.

The energy storage system 400 is hybrid and includes an ultracapacitor module 410 for storing potential electric energy. The ultracapacitor 410 is part of a bank of ultracapacitor modules and/or battery modules 160 that are connected in series and also are part of the energy storage system 400. The bank of ultracapacitor modules and/or battery modules 160 are mounted within a system housing 304. A plurality of system housings 304 may be disposed within a single wind turbine 10, one for each of the pitch drive systems 32 corresponding to each of the rotor blades 22.

In an embodiment, the wind turbine 10 with three rotor blades 22 comprises three system housings 304, each containing an energy storage system 400 or a portion of a single energy storage system 400. The system housings 304 are secured to an internal wall of the nacelle 16 of the wind turbine 10. Moreover, the system housing(s) 304 comprise a frame for securing the bank of ultracapacitor modules and/or battery modules 160. The ultracapacitor module(s) 410 and/or battery modules 160 are removably mounted within the frame using any means of attaching or fastening known in the art. Further, the bank of ultracapacitor modules and/or battery modules 160 is communicatively coupled to the turbine controller 26 of the wind turbine 10 using a wiring harness or any other means known in the art.

The wiring harness may comprise a plurality of cables electrically connected to ports and terminals of the ultracapacitor module(s) 410. As such, in an embodiment, the ultracapacitor module 410 comprises a communications port, an external power input port for charge power 412, a positive terminal 414, and a negative terminal 416. The wiring harness is operable to transmit communication signals and current between the modules of the bank of ultracapacitor modules and/or battery modules 160 and the turbine controller 26, and any other component, system, or sub-system of the wind turbine 10. For example, the positive and negative terminals 414, 416 of the ultracapacitor module 410 are configured to transfer electrical energy stored within the ultracapacitor module 410 to the pitch drive system(s) 32 of the wind turbine 10 during an emergency pitch event.

Accordingly, the ultracapacitor module 410 is configured to interface with the same installation hardware and/or software (e.g., the harness, the frame, the system housing) intended for battery module(s) that are part of the bank of ultracapacitor modules and/or battery modules 160.

Returning to the embodiment of FIG. 6, the ultracapacitor module 410 comprises a housing 304 and terminals 414, 416. The housing 304 is configured to contain one or more internal capacitor cells 418 connected in series and an internal balancing network 420 for the cells 418. The terminals 414, 416 are exposed through the housing 304. The ultracapacitor module(s) 410 are electrically connected in series, as shown, with the positive terminal 414 of an adjacent module—either ultracapacitor or battery—communicatively coupled to the negative terminal 418 of the ultracapacitor module 410.

To mitigate the risk of a reverse biased capacitor failing in a hybrid system, the energy storage system 400 comprises one or more bypass diodes 430 arranged external to the housing of the ultracapacitor modules 410. The one or more external bypass diodes 430 provide a current flow path for the electrical output derived from the bank of ultracapacitor modules and battery modules 160, for example, during a fault or a failure of the ultracapacitor module 410. Moreover, the energy storage system 410 also comprises any other hardware and equipment known in the art necessary to facilitate use of the hybrid system, e.g., external charging and monitoring hardware 412. In an embodiment, the ultracapacitor module 410 may additionally comprise an internal charger also connected in parallel with the terminals. In another embodiment, the internal charged may be fully integrated into the ultracapacitor module 410.

Accordingly, the ultracapacitor modules 410 and the rest of the hybrid energy storage system 400 is configured to provide sufficient current and voltage to the pitch drive system 32 of the wind turbine 10 during extreme, unexpected, and long-lasting load events, even if one of the ultracapacitor cells/ultracapacitor modules fails. The ultracapacitor modules 410 and the rest of the hybrid energy storage system 400 will continue to safely, effectively, and efficiently provide sufficient electrical output for electrically powering the pitch drive mechanism 32.

Referring now to FIG. 7, a partial, schematic diagram of a portion of another embodiment of a hybrid energy storage system 500 is shown. The energy storage system 500 is used for electrically powering a pitch drive system(s) 32 of the wind turbine 10 of FIG. 1-5.

The energy storage system 500 includes an ultracapacitor module 510 comprising a housing 304 and terminals 514, 516. The terminals are exposed through the housing 304. The ultracapacitor module(s) 510 are electrically connected in series, as shown, with the positive terminal 516 of an adjacent module—either ultracapacitor or battery—communicatively coupled to the negative terminal 514 of the ultracapacitor module 510.

The housing 304 of the ultracapacitor module 510 contains one or more internal capacitor cells 518 connected in series, an internal balancing network 520 for the cells, and one or more integrated, internal bypass diodes arranged together to form a bypass circuit that is integrated and internal to the ultracapacitor module 510. The integrated, internal bypass circuit 530 is connected in parallel with the terminals 514, 516. As such, the integrated, internal bypass circuit 530 of the ultracapacitor module 510 provides a current flow path for the electrical output derived from the bank of ultracapacitor modules and battery modules 160, for example, during a fault or a failure of the cell(s) 518 and/or other components of the ultracapacitor module 510 and mitigates the risk of a reverse biased capacitor.

Returning to the embodiment of FIG. 7, the energy storage system 510 and/or the ultracapacitor module 510 also comprise any other hardware and equipment known in the art necessary to facilitate use of the hybrid system, e.g., external charging and monitoring hardware. In an embodiment, the ultracapacitor module 510 may additionally comprise an external or internal charger 512 also connected in parallel with the terminals 514, 516 and the integrated, internal bypass circuit 530. In another embodiment, the internal charger may be fully integrated into the ultracapacitor module 510.

Accordingly, the ultracapacitor modules 510 and the rest of the hybrid energy storage system 500 it does not necessitate additional wiring, special crimping processes, or additional module connection terminals or exposed diode terminals, that can put wind turbine technicians at risk due to short-circuits, electrical arcing, electrocution, and/or explosion of discharging capacitor cell(s), for example.

Referring now to FIG. 8, a partial, schematic diagram of a portion of another embodiment of a mono-source or hybrid energy storage system 600 is shown. The energy storage system 600 includes an ultracapacitor module 610 comprising a housing 304 and terminals 614, 616 exposed through the housing 304. The ultracapacitor module(s) 610 are electrically connected in series, as shown, with the positive terminal 614 of an adjacent module—either ultracapacitor or battery—communicatively coupled to the negative terminal 616 of the ultracapacitor module 610.

The housing 304 of the ultracapacitor module 610 contains a plurality of individual capacitor cells or ultracapacitor cells 618 connected in series, an internal balancing network for the cells 620, and one or more integrated, internal bypass diodes 630 in a network to form a bypass circuit that is integrated and internal to the ultracapacitor module 610, and that is connected in parallel to each individual capacitor cell or ultracapacitor cell. As such, the integrated, internal bypass circuit of the ultracapacitor module 610 provides current flow path for the electrical output from the bank of ultracapacitor modules and/or battery modules 160, for example, during a fault or a failure of one or more individual capacitor cells or ultracapacitor cell in one or more ultracapacitor modules, for example.

Returning to the embodiment of FIG. 8, the energy storage system 610 and/or the ultracapacitor module 610 also comprise any other hardware and equipment known in the art necessary to facilitate use of the hybrid system, e.g., external charging and monitoring hardware 612. In an embodiment, the ultracapacitor module 610 may additionally comprise an internal charger also connected in parallel with the terminals and the integrated, internal bypass circuit. In another embodiment, the internal charged may be fully integrated into the ultracapacitor module 610.

Accordingly, the ultracapacitor modules 610 and the rest of the hybrid energy storage system 600 does not necessitate additional wiring, special crimping processes, or additional module connection terminals or exposed diode terminals. Moreover, the ultracapacitor module 610 is configured to draw as much power from each individual cell that is not faulted or failed, allowed for increased efficiencies in materials and equipment for the energy storage system 600 and the wind turbine 10.

A person having ordinary skill in the art will recognize the interchangeability of various features from different embodiments. Similarly, the various features described, as well as other known equivalents for each such limitation or feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. An ultracapacitor module comprising:
a housing containing one or more internal capacitor cells and one or more integrated, internal bypass diodes arranged together to form an integrated, internal bypass circuit; and
terminals, the terminals exposed through the housing, the integrated, internal bypass circuit connected in parallel with the terminals.

Clause 2. The ultracapacitor module of clause 1, wherein the housing contains two or more internal capacitor cells.

Clause 3. The ultracapacitor module of clause 2, wherein the two or more internal capacitor cells are connected in series and integrated within the housing.

Clause 4. The ultracapacitor module of clause 3, wherein the housing additionally contains a balancing network for the two or more internal capacitor cells.

Clause 5. The ultracapacitor module of any of the proceeding clauses, wherein the housing additionally contains an internal charger connected in parallel with the terminals and the integrated, internal bypass circuit.

Clause 6. The ultracapacitor module of clause 5, wherein the internal charger is integrated within the housing.

Clause 7. The ultracapacitor module of any of clauses 5-6, wherein the housing additionally contains a balancing network for the two or more internal capacitor cells.

Clause 8. The ultracapacitor module of clause 7, wherein the balancing network is integrated within the housing.

Clause 9. An ultracapacitor module comprising:
a housing containing one or more internal capacitor cells and at least one set of one or more integrated, internal bypass diodes connected in parallel to the one or more internal capacitor cells to form an integrated, internal bypass circuit; and
terminals, the terminals exposed through the housing.

Clause 10. The ultracapacitor module of clause 9, wherein the housing contains two or more internal capacitor cells.

Clause 11. The ultracapacitor module of any of clauses 9-10, wherein the two or more internal capacitor cells are connected in series, integrated within the housing, and connected in parallel to the integrated, internal bypass circuit.

Clause 12. The ultracapacitor module of any of clauses 9-11, wherein the housing additionally contains a balancing network for the two or more internal capacitor cells.

Clause 13. The ultracapacitor module of any of clauses 9-12, wherein the housing additionally contains an internal charger connected in parallel with the terminals.

Clause 14. The ultracapacitor module of clause 13, wherein the internal charger is integrated within the housing.

Clause 15. The ultracapacitor module of any of clauses 13-14, wherein the housing additionally contains a balancing network for the two or more internal, connected capacitor cells.

Clause 16. The ultracapacitor module of clause 15, wherein the balancing network is integrated within the housing.

Clause 17. A wind turbine comprising an energy storage system for electrically powering, at least a portion of, the wind turbine with an electrical output from one or more ultracapacitor modules connected to one or more battery modules, the wind turbine comprising:
one or more ultracapacitor modules, each of the one or more ultracapacitor modules comprising:
 a housing, the housing containing:
  one or more internal capacitor cells and one or more integrated, internal bypass diodes arranged together to form an integrated, internal bypass circuit; or
  one or more internal capacitor cells and at least one set of one or more integrated, internal bypass diodes connected in parallel to the one or more internal capacitor cells to form an integrated, internal bypass circuit; and
 terminals, the terminals exposed through the housing; and
one or more battery modules connected to the one or more ultracapacitor modules via the terminals;
wherein, if the housing contains the one or more internal capacitor cells and the at least one set of one or more integrated, internal bypass diodes connected in parallel to the one or more internal capacitor cells to form the integrated, internal bypass circuit, the integrated, internal bypass circuit is connected in parallel with the terminals.

Clause 18. The energy storage system of clause 17, wherein the one or more ultracapacitor modules and the one or more battery modules are interchangeable.

Clause 19. The energy storage system of any of clauses 17-18, wherein the housing of each of the one or more ultracapacitor modules additionally contains an internal charger connected in parallel with the terminals and the integrated, internal bypass circuit.

Clause 20. The energy storage system of any of clauses 17-19, wherein the internal charger is integrated within the housing.

What is claimed is:

1. An ultracapacitor module comprising:
a housing containing one or more internal capacitor cells and one or more integrated, internal bypass diodes arranged together to form an integrated, internal bypass circuit; and
terminals, the terminals exposed through the housing, the integrated, internal bypass circuit connected in parallel with the terminals.

2. The ultracapacitor module of claim 1, wherein the housing contains two or more internal capacitor cells.

3. The ultracapacitor module of claim 2, wherein the two or more internal capacitor cells are connected in series and integrated within the housing.

4. The ultracapacitor module of claim 2, wherein the housing additionally contains a balancing network for the two or more internal capacitor cells.

5. The ultracapacitor module of claim 1, wherein the housing additionally contains an internal charger connected in parallel with the terminals and the integrated, internal bypass circuit.

6. The ultracapacitor module of claim 5, wherein the internal charger is integrated within the housing.

7. The ultracapacitor module of claim 5, wherein the housing additionally contains a balancing network for the two or more internal capacitor cells.

8. The ultracapacitor module of claim 7, wherein the balancing network is integrated within the housing.

9. An ultracapacitor module comprising:
a housing containing one or more internal capacitor cells and at least one set of one or more integrated, internal bypass diodes connected in parallel to the one or more internal capacitor cells to form an integrated, internal bypass circuit; and
terminals, the terminals exposed through the housing.

10. The ultracapacitor module of claim 9, wherein the housing contains two or more internal capacitor cells.

11. The ultracapacitor module of claim 10, wherein the two or more internal capacitor cells are connected in series, integrated within the housing, and connected in parallel to the integrated, internal bypass circuit.

12. The ultracapacitor module of claim 11, wherein the housing additionally contains a balancing network for the two or more internal capacitor cells.

13. The ultracapacitor module of claim 9, wherein the housing additionally contains an internal charger connected in parallel with the terminals.

14. The ultracapacitor module of claim 13, wherein the internal charger is integrated within the housing.

15. The ultracapacitor module of claim 13, wherein the housing additionally contains a balancing network for the two or more internal, connected capacitor cells.

16. The ultracapacitor module of claim 15, wherein the balancing network is integrated within the housing.

17. A wind turbine comprising an energy storage system for electrically powering, at least a portion of, the wind turbine with an electrical output from one or more ultracapacitor modules connected to one or more battery modules, the wind turbine comprising:
one or more ultracapacitor modules, each of the one or more ultracapacitor modules comprising:
 a housing, the housing containing:
  one or more internal capacitor cells and one or more integrated, internal bypass diodes arranged together to form an integrated, internal bypass circuit; or
  one or more internal capacitor cells and at least one set of one or more integrated, internal bypass diodes connected in parallel to the one or more internal capacitor cells to form an integrated, internal bypass circuit; and
 terminals, the terminals exposed through the housing; and
one or more battery modules connected to the one or more ultracapacitor modules via the terminals;
wherein, if the housing contains the one or more internal capacitor cells and the at least one set of one or more integrated, internal bypass diodes connected in parallel to the one or more internal capacitor cells to form the integrated, internal bypass circuit, the integrated, internal bypass circuit is connected in parallel with the terminals.

18. The energy storage system of claim 17, wherein the one or more ultracapacitor modules and the one or more battery modules are interchangeable.

19. The energy storage system of claim 17, wherein the housing of each of the one or more ultracapacitor modules additionally contains an internal charger connected in parallel with the terminals and the integrated, internal bypass circuit.

20. The energy storage system of claim 19, wherein the internal charger is integrated within the housing.

* * * * *